(12) United States Patent
Förg et al.

(10) Patent No.: US 10,729,923 B2
(45) Date of Patent: Aug. 4, 2020

(54) INTUMESCENT FIRE RESISTANCE DEVICE AND BREACH IN A WALL

(71) Applicant: Hilti Aktiengesellschaft, Schaan (LI)

(72) Inventors: Christian Förg, Lamerdingen (DE); Herbert Münzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/335,776

(22) PCT Filed: Nov. 13, 2017

(86) PCT No.: PCT/EP2017/079012
§ 371 (c)(1),
(2) Date: Mar. 22, 2019

(87) PCT Pub. No.: WO2018/095750
PCT Pub. Date: May 31, 2018

(65) Prior Publication Data
US 2019/0247686 A1    Aug. 15, 2019

(30) Foreign Application Priority Data
Nov. 24, 2016    (EP) ..................... 16200512

(51) Int. Cl.
*A62C 2/06*    (2006.01)
*F16L 5/04*    (2006.01)
*H02G 3/04*    (2006.01)
*H02G 3/22*    (2006.01)
*E04B 1/94*    (2006.01)

(52) U.S. Cl.
CPC .............. *A62C 2/065* (2013.01); *E04B 1/947* (2013.01); *F16L 5/04* (2013.01); *H02G 3/0412* (2013.01); *H02G 3/22* (2013.01)

(58) Field of Classification Search
CPC ........ A62C 2/065; H02G 3/22; H02G 3/0412; E04B 1/947; F16L 5/04
See application file for complete search history.

(56) References Cited

U.S. PATENT DOCUMENTS 5,155,957 A * 10/1992 Robertson .............. A62C 2/065
137/360

FOREIGN PATENT DOCUMENTS

EP    0 506 497    9/1992

OTHER PUBLICATIONS

International Search Report dated Nov. 30, 2017 in PCT/EP2017/079012.
Written Opinion dated Nov. 30, 2017 in PCT/EP2017/079012.

* cited by examiner

*Primary Examiner* — Patrick J Maestri
(74) *Attorney, Agent, or Firm* — Grüneberg and Myers PLLC

(57) ABSTRACT

An intumescent fire resistance device for closing breaches in walls or ceilings, contains a plurality of planar carriers which are provided with an intumescent coating on at least one side. The carriers are secured to one another at least partially overlapping in an overlap region such that a strip or ring is produced the length of which is longer than the length of an individual carrier.

19 Claims, 3 Drawing Sheets b)

b)

INTUMESCENT FIRE RESISTANCE DEVICE AND BREACH IN A WALL

Figure 1:
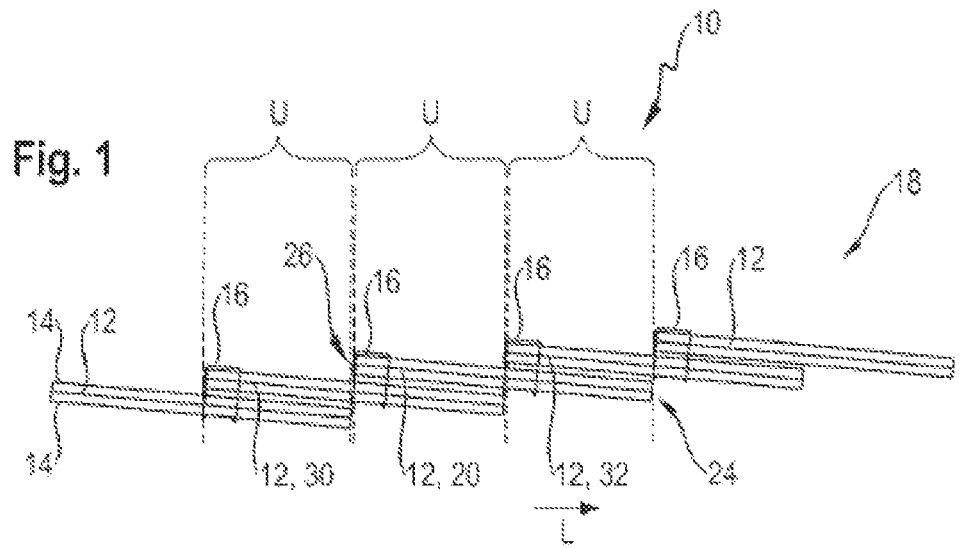

This application is a National Stage entry under § 371 of international Application No. PCT/EP2017/079012, filed on Nov. 13, 2017, and which claims the benefit of European Application No. 1620051283, filed on Nov. 24, 2016.

The invention relates to an intumescent fire-protection device for sealing of openings in walls or ceilings as well as to an opening in a wall or ceiling, having an inner wall and an intumescent fire-protection device bearing on the inner wall.

Fire-protection walls and ceilings are subject to special regulations in terms of their perviousness to smoke and of their fire resistance. However, lines, pipes or other objects must also be routed through fire-protection walls. For this purpose, openings are made in the fire-protection wall in order to route the objects through it. Due to these openings, however, the properties of the wall or ceiling as fire-protection walls are impaired, and so the openings must be sealed once again.

For this purpose, fire-protection devices are used that contain an intumescent material and that surround the combustible lines in the opening. In the event of a fire, the material of the line burns away, whereby an undesired cavity is formed. This cavity is sealed by the swelling of the intumescent material of the fire-protection device, so that it is again smokeproof and fireproof.

However, the intumescent materials usually need a temperature of at least approximately 200° C. in order to initiate the intumescence, i.e. the swelling of the intumescent material.

Usually, however, the lines have a melting point lower than 200° C., and so the lines burn away or melt even before intumescence sets in. Thus the cavities are formed before intumescence begins, and then they must be rapidly sealed.

In standard fire-protection devices, one problem is that only the end faces of the fire-protection device are in direct contact with the fire, whereby the intumescence is initiated rapidly only at the end faces. Due to the swelling at the end face, however, the further regions of the fire-protection device are insulated from the fire, and so intumescence sets in much later in these further regions.

It is therefore the object of the invention to provide an intumescent fire-protection device for sealing of openings in walls or ceilings that rapidly and completely seal the cavities formed due to burnup of the lines.

The object is solved by an intumescent fire-protection device for sealing of openings in walls or ceilings, having several plate-like carriers, which are equipped on at least one side with an intumescent coating, wherein the carriers are fastened to one another in a manner partly overlapping one another in an overlap region in such a way that a strip or ring is obtained having a length greater than the length of an individual carrier.

In this connection, openings used for penetration of pipelines, especially waste-water pipes in the subsoil, are also to be understood as such openings in walls or ceilings.

By the fact that the fire-protection device is composed of several overlapping carriers, it is possible to space the carriers apart from one another in the overlap region. Thereby channels for hot smoke and fire are formed within the fire-protection device, and so the surface exposed to smoke or fire is enlarged. Due to this larger surface compared with rigid annular fire-protection devices, fire or hot smoke is able to lead to more rapid heating of the entire fire-protection device. Thus the temperature at which intumescence sets in is reached rapidly. In this way, openings formed in the cavity can be sealed more rapidly.

Preferably the carriers are joined at their rear longitudinal end to the respective leading carrier, and the joint of the carriers to the respective trailing carrier subdivides the carriers into two portions in such a way that the front longitudinal end of the carriers is not fastened. In other words, the carriers are fastened to one another only at one place in longitudinal direction. The said terms "leading" "trailing", "longitudinal end", etc. in relation to the longitudinal extent or direction of the strip or ring relate to when the strip is spread out at the bottom or the ring is unrolled. These terms are used merely to simplify the description, since obviously a closed strip or a ring does not have any longitudinal ends or a sequence or direction.

By the fact that the carriers are joined at their respective rear longitudinal end to the respective leading carrier, the front end is freely movable relative to the other carriers and is therefore able to move into the cavities formed by burnup of the line, whereby the surface and the sealed volume of the fire-protection device is increased immediately after formation of the cavity.

For example, the carriers are fastened to one another by means of a clamp and/or by a seam, especially using a filament, preferably of polyamide, aramide, carbon, glass, ceramic or steel fibers, whereby a cost-effective and joint capable of bearing load is produced between the carriers.

In one embodiment of the invention, the coating is provided at least partly in part of the overlap region between the two overlapping carriers. In this way, swelling of the coating in the overlap region causes the carriers to move further away from one another, so that a self-reinforcing effect is achieved.

For example, the carriers together with the coating have at least one incision, which extends from the front longitudinal end. These incisions likewise extend in substantially longitudinal direction, so that the mobility of the carriers is significantly different from one another.

In an alternative embodiment, when the intumescent fire-protection device is spread out without loading, the front longitudinal end of the carriers is spaced apart from the respective trailing carrier together with coating. These carriers may be concave. In this way, the carriers are preloaded relative to one another when the intumescent fire-protection device is disposed in an opening between the inner wall of the opening and the line.

Preferably, the carriers are constructed identically, whereby the manufacturing costs can be greatly lowered.

For example, the carriers have a rectangular base face, wherein the longer side of the rectangular base face is oriented in longitudinal direction of the strip, whereby a strip or a ring is realized in simple manner.

In one embodiment of the invention, the carriers are equipped with the coating on both sides, whereby a particularly large surface of the intumescent coating is provided.

Preferably, the coating is provided between the overlapping carriers at least in the region of the front longitudinal end, so that the carriers are effectively spaced apart from one another by the lever effect during swelling of the coating.

In one alternative embodiment, the coating is applied on the carriers over the full surface, whereby the production of the fire-protection device is simplified.

In one configuration of the invention, the carriers are produced from a fabric or a mesh, especially a glass-fiber fabric or a glass-fiber mesh, whereby strong and at the same time flexible carriers are possible.

For example, the intumescent fire-protection device is provided with at least one hook, with which the intumescent fire-protection device can be fastened to a wall or ceiling, whereby no additional parts are required for mounting in front of a wall. These hooks may be made of steel.

Furthermore, the object is solved by an opening in a wall or ceiling having an inner wall and an intumescent fire-protection device bearing on the inner wall as described in the foregoing, wherein the longitudinal ends of the carriers that are situated radially inward in the respective overlap region are movable relative to the carriers situated radially outward in the respective overlap region. In this way, the radially inwardly situated longitudinal ends of the carriers are able to move in corresponding cavities without too great exertion of force.

For example, the longitudinal ends of the carriers that are situated radially outward in the respective overlap region are fastened to the radially inwardly situated carriers, whereby the scope of movement of the free longitudinal ends of the carriers is maximized.

Figure 2:
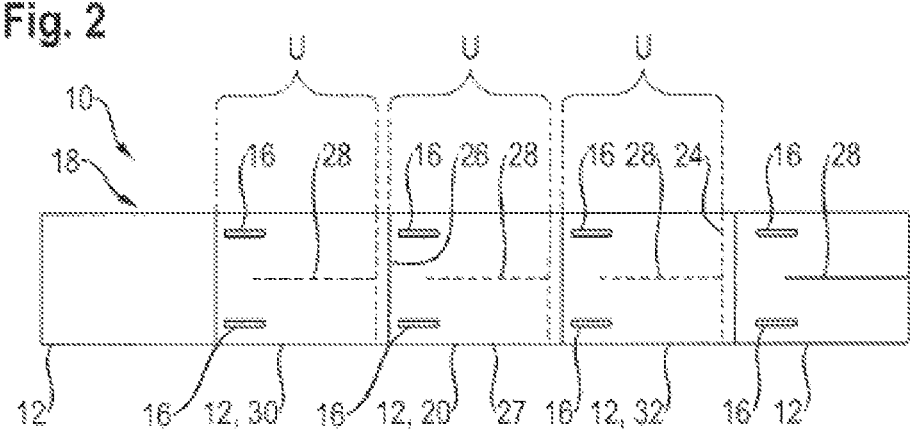
Figure 3:
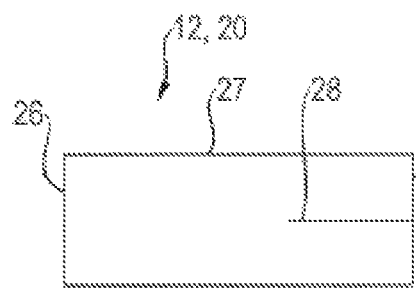
Figure 3:
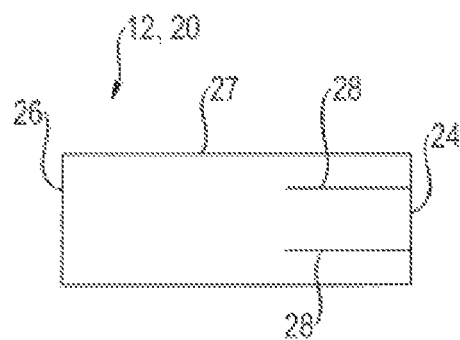
Figure 4:
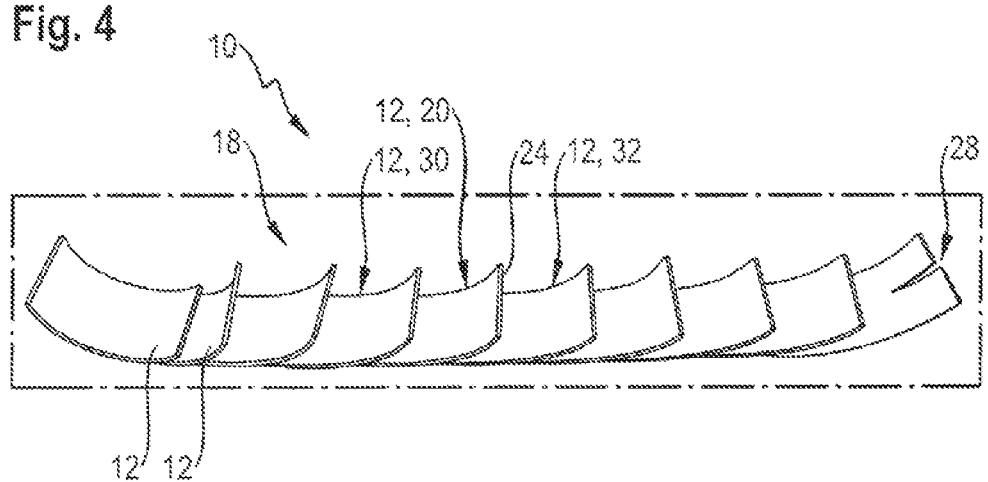
Figure 5A:
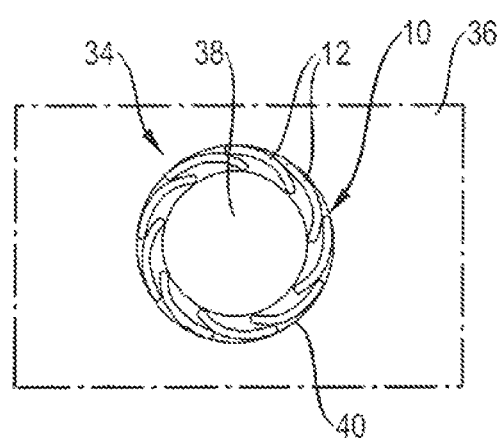
Figure 5A:
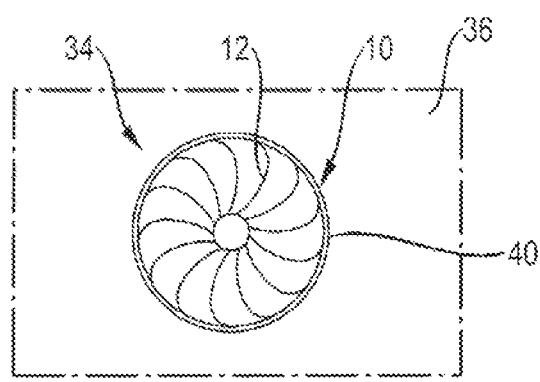
Figure 6:
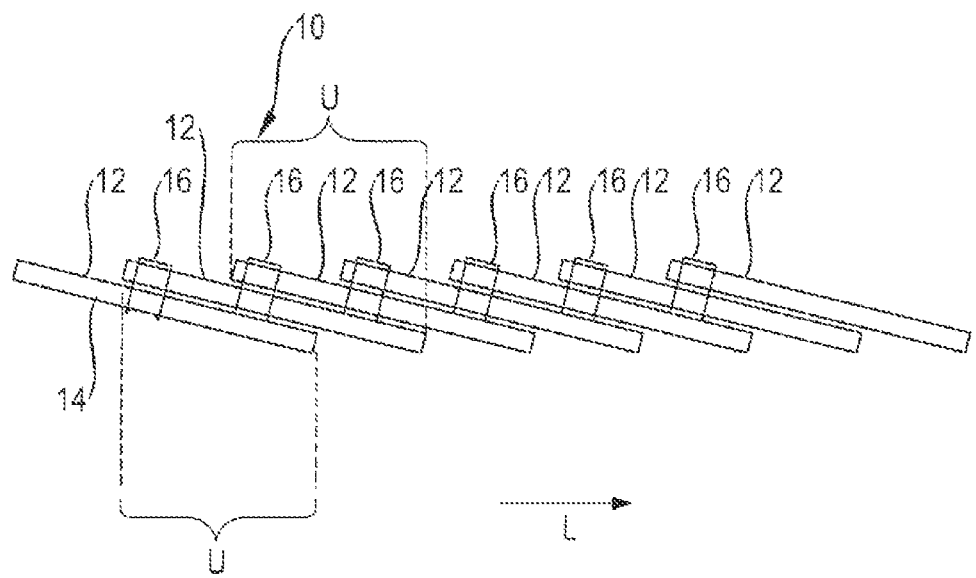
Figure 7:
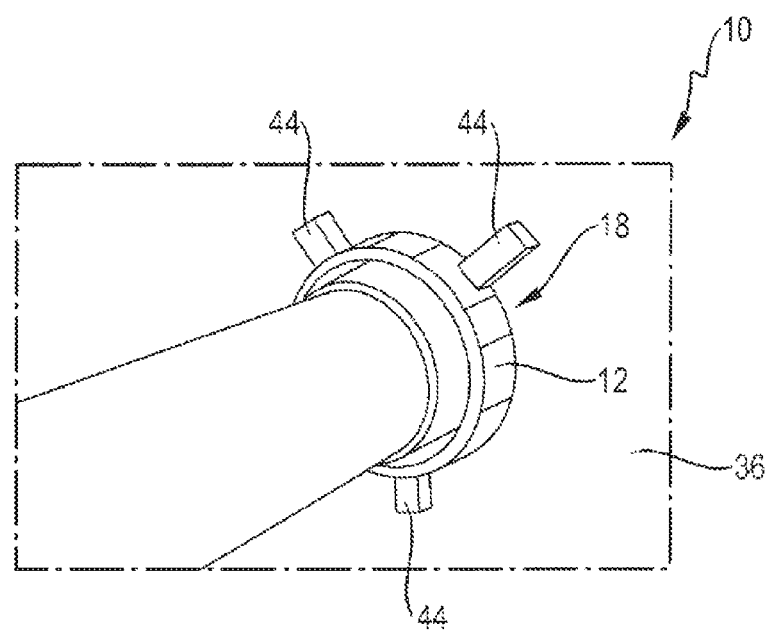

Further features and advantages of the invention will become apparent from the description hereinafter as well as from the attached drawings, to which reference is made. In the drawings:

FIG. 1 shows a schematic side view of an inventive intumescent fire-protection device, FIG. 2 shows a schematic overhead view of the intumescent fire-protection device according to FIG. 1, FIG. 3a schematically shows an individual carrier of the intumescent fire-protection device according to FIG. 1, FIG. 3b shows a further embodiment of a carrier for an inventive intumescent fire-protection device, FIG. 4 shows the intumescent fire-protection device according to FIG. 1, spread out without being loaded, FIG. 5a schematically shows an inventive opening having a line and an inventive intumescent fire-protection device, FIG. 5b schematically shows the opening according to FIG. 5a after a fire, FIG. 6 shows a schematic side view of a second embodiment of an inventive intumescent fire-protection device, and FIG. 7 shows a further embodiment of an inventive intumescent fire-protection device.

FIGS. 1 and 2 show an intumescent fire-protection device 10, abbreviated to simply fire-protection device 10 hereinafter, having several plate-like carriers 12, which are equipped with an intumescent coating 14.

Carriers 12 may be produced from a fabric or a mesh, especially a glass-fiber fabric or a glass-fiber mesh.

In this first embodiment, coating 14 is applied over the full surface and on both sides of carriers 12, so that respectively the entire carrier 12 is equipped with coating 14.

Carriers 12 are disposed in overlapping manner, wherein respectively an overlap region U is formed between two carriers 12.

In overlap region U, carriers 12 are fastened to one another by means of respectively two clamps 16, whereby a long strip 18 is formed.

Strip 18 has a longitudinal direction L, and so carriers 12 also have longitudinal ends 24, 26.

Clamps 16 are provided only at one place in longitudinal direction L, meaning that they are not offset relative to one another. Obviously, it is also possible for respectively only one clamp 16 to be provided for fastening of two carriers 12. Clamps 16 may also be disposed in a manner turned by 90° (not shown).

It is also conceivable that carriers 12 are fastened to one another by a seam using a filament, for example of polyamide, aramide, carbon, glass, ceramic or steel fiber, and/or that the first and the last carrier 12 are likewise joined to one another, so that a ring is obtained.

For better description, the right side in the figures is designated the front side. Obviously a strip 18 does not have such a predetermined direction, but nevertheless it is possible thereby to distinguish between the front longitudinal end 24 and the rear longitudinal end 26 of carriers 12. Also, carriers 12 disposed to the right of a given carrier are referred to as "trailing carriers" and carriers 12 disposed to the left of a given carrier 12 are referred to as "leading carriers".

Carriers 12 are constructed identically and are fastened to one another identically, and so the structure of strip 18 of fire-protection device 10 will now be explained, by way of example, on the basis of a middle carrier 20, i.e. a carrier 12 in the middle of strip 18.

Middle carrier 20 is illustrated in overhead view in FIG. 3a. Middle carrier 20 as well as all other carriers 12 has a rectangular base face, wherein longer side 27 is oriented in longitudinal direction L of the strip 18. From front longitudinal end 24, an incision 28 extends in longitudinal direction L toward rear longitudinal end 26 of middle carrier 20.

It is also conceivable, as illustrated in FIG. 3b, for carrier 12 to have several incisions 28, in this case two incisions 28.

As can be seen in FIGS. 1 and 2, middle carrier 20 has an adjacent leading carrier 30 and an adjacent trailing carrier 32, and so middle carrier 20 lies in two overlap regions U, namely in an region of overlap with leading carrier 30 and a region of overlap with trailing carrier 32.

Middle carrier 20 is joined at its rear longitudinal end 26 to leading carrier 30 by clamps 16.

In the same way, middle carrier 20 is joined to its trailing carrier 32, wherein clamps 16 are provided here at the rear longitudinal end of trailing carrier 32 and thus in the middle of middle carrier 20. In this way, clamps 16 or the joint of carriers 20, 32 divide middle carrier 20 into two portions.

The front portion thereof, including front longitudinal end 24, is not fastened, whereas the rear portion is joined to leading carrier 30.

Incision 28 of middle carrier 20 extends almost completely through the front portion of middle carrier 20.

In FIG. 4, fire-protection device 10 is illustrated in spread-out condition without being loaded. Here it is evident that carriers 12 may be formed concavely, so that front longitudinal ends 24 or respectively the front portions are spaced apart from trailing carriers 32.

By the fact that coating 14 is applied on carrier 12 over the entire surface, coating 14 is provided in each of the overlap regions U and also in the region of the front longitudinal end 26 between overlapping carriers 32 and 20.

In FIGS. 5a and 5b, an opening 34 in a wall 36 is illustrated, through which a line 38 is routed.

However, line 38 does not fill opening 34 completely, and so a gap is formed between line 38 and an inner wall 40 of opening 34. Fire-protection device 10 is disposed in this gap. For reasons of clarity, only carriers 12 of fire-protection device 10 are illustrated in FIGS. 5a and 5b, but coating 14 is not.

Strip 18 of fire-protection device 10 surrounds line 38 completely, and so strip 18 describes a ring.

Fire-protection device 10 is inserted into the gap in such a way that the free, front longitudinal ends 24 of carriers 12 are situated radially inward. This means that the carriers 12 situated radially inward in the respective overlap region U are movable relative to the respective carriers 12 situated radially outward.

Likewise, due to this arrangement, the longitudinal ends of carriers 12 that are situated radially outward in overlap region U are fastened to the radially inwardly situated carrier 12 by means of clamps 16.

The free, front longitudinal ends 24 are then preloaded relative to lines 38 due to the convex shape of carriers 12.

In case of a fire in the region of opening 34, line 38 melts first of all and at this place leaves behind a cavity in opening 34, which is completely surrounded by fire-protection device 10.

As soon as line 38 has been destroyed, front longitudinal ends 24 of carriers 12 move radially inward due to their preloading. In this way, the surface that comes into contact with the hot smoke being drawn through the cavity or with the fire becomes larger, since spaces or channels have now formed between the individual carriers 12.

If regions of coating 14 are now heated so much that intumescence sets in, coating 14 swells up in these regions. In the process, it forces the free, front longitudinal ends 24 of carriers 12 further into the cavity in this region and thereby further enlarges the space and the channels between the individual carriers 12.

In this way, the surface of fire-protection device 10 and thus the flow of hot smoke or fire through fire-protection device 10 become even greater.

Thus already swollen regions of coating 14 do not insulate the other, inactive regions. Instead, the contrary is the case, since regions that have already swollen up lead to enlargement of the spaces and channels and thus permit better heat transport to the inactive regions. This effect becomes progressively more intensive, until ultimately the entire coating 14 has swollen up.

When the entire coating 14 has swollen up, all free longitudinal ends 24 of carriers 12 have been moved toward the middle and the iris-like structure of fire-protection device 10 illustrated in FIG. 5b has been formed. This illustrates the optimum distribution of the volume of the starting compound.

In this situation, the entire cavity or the entire opening 34 is filled by intumescent coating 14, so that opening 34 is again closed in smokeproof and fireproof manner. The stability of the ash crust is reinforced by the carriers.

A second embodiment of fire-protection device 10 is illustrated in FIG. 6. It corresponds substantially to the first embodiment of the fire-protection device according to FIG. 1, and so only the differences will be discussed hereinafter. Like and functionally similar parts are denoted by the same reference symbols.

One difference compared with the first embodiment is that coating 14 is applied only on one side of carriers 12.

Coating 14 is applied on that side of carriers 12 which is situated radially inward in the fastened condition of fire-protection device 10 in opening 24.

A second difference is that the free end (approximately 60%) is longer and thus larger diameters can be covered. Preferably, fire-protection device 10 is provided in overlap region U with a carrier having 3 layers.

In FIG. 7, a further embodiment of fire-protection device 10 is illustrated in a manner fastened to a wall 36.

In this embodiment, hooks 44, with which fire-protection device 10 is fastened on wall 36, are provided on strip 18 and thus on individual carriers 12. By this type of attachment, it is possible to choose a smaller diameter for opening 34. Hooks 44 may be made of steel.

In other respects, however, fire-protection device 10 itself may be designed according to one of the foregoing embodiments.

The invention claimed is:

1. An intumescent fire-protection device for sealing of openings in walls or ceilings, said intumescent fire-protection device comprising:
a plurality carriers which are equipped on at least one side with an intumescent coating, wherein the carriers are successively fastened to one another with fasteners in such a manner that adjacent ones of the carriers are partly overlapping one another, a rear end of each of the carriers fastened to an adjacent one of the carriers at a point between a front end and a rear end of the adjacent one of the carriers, the front end of each of the carriers remaining unfastened to the adjacent one of the carriers, the successively fastened carriers forming a strip or ring having a length greater than a length of any of the carriers taken individually.

2. The intumescent fire-protection device according to claim 1, wherein each of the carriers comprises two portions as a result of the carriers partly overlapping one another, a first portion of the two portions having an upper surface covered by an adjacent carrier and a second portion of the two portions having an upper surface not covered by an adjacent carrier, the front unfastened end of each of the carriers being included in the second portion.

3. The intumescent fire-protection device according to claim 1, wherein the fasteners are at least one of clamps or seams.

4. The intumescent fire-protection device according to claim 1, wherein the coating is provided at least partly in an overlap region between adjacent ones of the carriers.

5. The intumescent fire-protection device according to claim 1, wherein each of the carriers together with the coating comprise at least one incision, which extends from the front end.

6. The intumescent fire-protection device according to claim 1, wherein, when the intumescent fire-protection device is spread out without loading, the front end of each of the carriers is spaced apart from an adjacent one of the carriers together with the corresponding coating.

7. The intumescent fire-protection device according to claim 1, wherein the carriers are constructed identically.

8. The intumescent fire-protection device according to claim 1, wherein each of the carriers comprises a rectangular base face, and wherein a longer side of the rectangular base face is oriented in a longitudinal direction of the strip.

9. The intumescent fire-protection device according to claim 1, wherein the carriers are equipped on upper and lower surfaces with the coating.

10. The intumescent fire-protection device according to claim therein the coating is provided at least in a region of the front end of each carrier.

11. An intumescent fire-protection device according to claim 1, wherein the coating is applied over an entire surface of each of the carriers.

12. The intumescent fire-protection device according to claim 1, wherein the carriers comprise a fabric or a mesh.

13. The intumescent fire-protection device according to claim 1, further comprising at least one hook to couple the intumescent fire-protection device to a wall or ceiling.

14. An opening in a wall or ceiling, comprising:
an inner wall, and
bearing on the inner wall, an intumescent fire-protection device according to claim 1, arranged as a ring
wherein one of the front or rear ends of the carriers are situated radially inward in overlap regions between adjacent ones of the carriers and are movable relative to the other of the front or rear ends of the carriers that are situated radially outward in the overlap regions.

15. The opening according to claim 14, wherein the other of the front or rear ends of the carriers that are situated radially outward in the overlap regions are fastened to the radially inwardly situated carriers, respectively.

16. A structure for a building feature, comprising:
the intumescent fire-protection device according to claim 1; and
at least one fastener to fasten the intumescent fire-protection device to the building feature passing through a hole in a building surface.

17. The intumescent fire-protection device according to claim 3, wherein said seams further comprise a plurality of filaments, each of the filaments fastening adjacent ones of the carriers to one another, respectively.

18. The intumescent fire-protection device according to claim 17, wherein the filaments include polyamide, aramide, carbon, glass, ceramic or steel fibers.

19. The intumescent fire-protection device according to claim 12, wherein the carriers comprise a glass-fiber fabric or a glass-fiber mesh.

* * * * *